(12) United States Patent
Schuffenhauer

(10) Patent No.: US 12,508,660 B2
(45) Date of Patent: Dec. 30, 2025

(54) ROTARY CUTTING TOOL AND HOLDING ELEMENT FOR A ROTARY CUTTING TOOL

(71) Applicant: KENNAMETAL INC., Latrobe, PA (US)

(72) Inventor: Michael Schuffenhauer, Fuerth (DE)

(73) Assignee: KENNAMETAL INC., Latrobe, PA (US)

( * ) Notice: Subject to any disclaimer, the term of this patent is extended or adjusted under 35 U.S.C. 154(b) by 480 days.

(21) Appl. No.: 17/726,708

(22) Filed: Apr. 22, 2022

(65) Prior Publication Data

US 2022/0339710 A1 Oct. 27, 2022

(30) Foreign Application Priority Data

Apr. 23, 2021 (DE) .......................... 102021110462.9

(51) Int. Cl.
B23B 51/00 (2006.01)

(52) U.S. Cl.
CPC .... B23B 51/0004 (2022.01); *B23B 2260/124* (2013.01)

(58) Field of Classification Search
CPC ............ B23B 51/0004; B23B 51/0003; B23B 2251/02; B23B 2260/124
See application file for complete search history.

(56) References Cited

U.S. PATENT DOCUMENTS

| | | | | |
|---|---|---|---|---|
| 1,047,466 A * | 12/1912 | Wagner | ................. | B23B 51/108 |
| | | | | 408/233 |
| 2,400,856 A | 5/1946 | Thompson | | |
| 5,064,316 A * | 11/1991 | Stojanovski | .......... | B23C 5/1036 |
| | | | | 407/113 |
| 5,863,157 A * | 1/1999 | Harano | ................. | B23C 5/2472 |
| | | | | 408/233 |
| 6,196,769 B1* | 3/2001 | Satran | ..................... | B23B 51/00 |
| | | | | 407/53 |
| 6,514,019 B1* | 2/2003 | Schulz | ............. | B23B 51/00035 |
| | | | | 408/59 |
| 7,044,695 B2* | 5/2006 | Stojanovski | .......... | B23C 5/1036 |
| | | | | 407/41 |

(Continued)

FOREIGN PATENT DOCUMENTS

| | | | | |
|---|---|---|---|---|
| DE | 10307213 A1 * | 9/2004 | ............. | B23B 51/02 |
| EP | 3427875 A1 * | 1/2019 | ............. | B23B 51/00 |

(Continued)

OTHER PUBLICATIONS

Mar. 1, 2024 Foreign Office Action Chinese Application No. CN202210417290.4, 2 pages.

*Primary Examiner* — Ryan Rufo
(74) *Attorney, Agent, or Firm* — John A. Wilaj, Jr.

(57) ABSTRACT

The described rotary cutting tool comprises a tool body extending along a rotational axis and a cutting insert comprising at least one cutting edge. The tool body is mounted in a mounting pocket delimited by two clamping fingers. A clamping finger bore is provided on each of the clamping fingers. The cutting insert also has a through bore. A holding element is arranged in the clamping finger bores and in the through bore to couple the cutting insert to the tool body. A section of the holding element located within the through bore is crowned. A holding element for such a rotary cutting tool is also presented.

10 Claims, 3 Drawing Sheets

(56) References Cited

U.S. PATENT DOCUMENTS

| | | | |
|---|---|---|---|
| 8,876,446 B2 * | 11/2014 | Shaheen | B23B 27/1622 |
| | | | 408/233 |
| 9,492,876 B2 * | 11/2016 | Saji | B23B 31/1077 |
| 10,576,552 B2 * | 3/2020 | Jäger | B23B 51/02 |
| 11,097,360 B2 * | 8/2021 | Rebholz | B23B 51/08 |
| 11,311,948 B2 * | 4/2022 | Johansson | B23B 51/02 |
| 2005/0129473 A1 | 6/2005 | Heule et al. | |
| 2008/0166197 A1 * | 7/2008 | Heule | B23B 51/00 |
| | | | 408/233 |
| 2013/0259590 A1 | 10/2013 | Shaheen | |
| 2017/0113281 A1 | 4/2017 | Schwägerl et al. | |
| 2018/0264558 A1 | 9/2018 | Jäger et al. | |
| 2018/0281084 A1 | 10/2018 | Frota de Souza Filho | |
| 2019/0308253 A1 | 10/2019 | Ning | |
| 2021/0154748 A1 * | 5/2021 | Johansson | B23B 51/02 |

FOREIGN PATENT DOCUMENTS

| | | | |
|---|---|---|---|
| JP | 2004261931 A | 9/2004 | |
| JP | 2016193461 | 11/2016 | |
| WO | WO-2006036041 A1 * | 4/2006 | B23B 51/0009 |

* cited by examiner

ROTARY CUTTING TOOL AND HOLDING ELEMENT FOR A ROTARY CUTTING TOOL

RELATED APPLICATION DATA

The present application claims priority pursuant to 35 U.S.C. § 119(a) to German Patent Application Number 102021110462.9 filed Apr. 23, 2021 which is incorporated herein by reference in its entirety.

FIELD

The invention relates to a rotary cutting tool, in particular a drilling tool, having a tool body extending along a rotational axis of the rotary cutting tool and a cutting insert comprising at least one cutting edge. The cutting insert is mounted in a mounting pocket delimited by two clamping fingers at a tool tip end of the tool body. A clamping finger bore extending substantially in the radial direction is provided on each of the clamping fingers. The cutting insert has a substantially radially extending through bore. Further, a holding element is arranged in the clamping finger bores and in the through bore to couple the cutting insert to the tool body.

The invention additionally specifies a holding element, in particular a set screw, for such a rotary cutting tool.

BACKGROUND

Such rotary cutting tools and associated holding elements are known from the prior art. In particular, they have the advantage that the mounting pocket and the holding element are accessible from the tool tip of the rotary cutting tool. Due to this configuration, a cutting insert can be replaced while a tool shank of the rotary cutting tool is clamped in a tool holder. Furthermore, such a configuration offers the advantage that there are large clearances in the tool body to route coolant channels.

Holding elements are known to be used to engage the clamping fingers to opposite sides of the cutting insert with a certain force. Thus, the cutting insert is held between the clamping fingers. Simply put, the clamping fingers are moved toward each other by means of the holding element. However, since the cutting insert is positioned between the clamping fingers, it is clamped into place in this way. In this context, one also speaks of a radial clamping of the cutting insert.

It should be understood in this context that the cutting insert must always be held firmly on the tool body in such a way that it does not move with respect to the tool body or even detaches from the tool body when a machining operation is performed using the rotary cutting tool.

SUMMARY

The object of the invention is to further improve known rotary cutting tools with regard to the coupling of the tool body and cutting insert. In particular, the reliability with which the cutting insert is held on the tool body is to be further increased.

The task is solved by a rotary cutting tool of the type mentioned above, wherein a portion of the holding element located within the through bore has a crowned shape. In this way, in addition to the radial clamping, it is possible to apply a clamping force on the cutting insert in the axial direction that is directed in particular towards a bottom of the mounting pocket. This holds the cutting insert to the tool body with particularly high reliability. In addition, the crowned design also creates a contact point or a contact line between the holding element and the cutting insert that is substantially centrally located within the cutting insert. The holding element thus contacts the cutting insert in the region of a rotational axis of the rotary cutting tool. For this reason, the clamping force acting in the axial direction is also introduced essentially centrally into the cutting insert, so that it is held on the tool body with high precision and in particular without any tilting. Further, the crowned design facilitates inserting the holding element into the through bore. In this context, tilting is likewise effectively prevented.

In the present case, a crowned design of the section of the holding element means that this section is radially flared based on an e.g., circular cylindrical shape, wherein a center axis of the holding element also forms a central axis of the circular cylinder. This is particularly visible when the holding element is viewed in a radially oriented direction with respect to the center axis. The outer contour of the crowned section, which is then visible, has a convex curvature.

In one variant, the portion of the holding element located within the through bore is barrel-shaped. A center axis of the barrel shape coincides with a center axis of the holding element. The center axis of the holding element in turn extends substantially radially in relation to a rotational axis of the rotary cutting tool. Because it is readily described mathematically, a crowning of a barrel-shaped body can be easily manufactured with conventional production machinery. Related rotary cutting tools and holding elements can therefore be produced inexpensively.

The holding element can also have a threaded section. One of the clamping finger bores can then be formed as a threaded bore, with the threaded portion being threaded into the threaded bore. The holding element is thus reliably held to the tool body with the threaded section threaded into the threaded bore. In addition, this connection between the holding element and the clamping finger can be used to draw the holding element and in particular the crowned section into the through bores of the cutting insert with a certain force, and thus to exert the clamping force acting in the axial direction on the cutting insert. Of course, the connection between the threaded section and the threaded bore can also be used to clamp the cutting insert radially. Overall, this results in a reliable coupling of the cutting insert to the tool body.

Preferably, a maximum diameter of the crowned section of the holding element is greater than a diameter of the threaded section. The holding element can therefore be particularly easily inserted into the clamping finger bores and the through bore if this occurs with the threaded section leading. The holding element is also centered within the clamping finger bores and the through bore.

The holding element can also have a head section that has a diameter larger than the remaining sections of the holding element. In this case, the head section is accommodated in a mounting section of an assigned clamping finger bore. The holding element can thus be readily gripped on the head section. In addition, a mating geometry for an assembly tool can be provided on the head section so that the holding element can be easily attached to the tool body by means of such an assembly tool. In the event that a threaded section is additionally provided on the holding element, the threaded section and the head section can interact in such a way that the two clamping fingers are moved toward each other by threading the threaded section into the corresponding threaded hole, thus clamping the cutting insert radially.

Preferably, a minimum diameter of the head section is equal to or greater than a maximum diameter of the crowned section of the holding element. The holding element can then only be mounted on the tool body in a single direction. Consequently, incorrect assembly of the holding element is made difficult or even prevented.

Further, the head section can be conically tapered at least in sections. The mounting section can also be conically tapered at least in sections corresponding to the head section. The holding element is thus centered in the clamping finger openings and the through bore in that the head section is positioned in the mounting section. This results in precise and reliable clamping of the cutting insert.

According to an embodiment, the center axes of the clamping finger bores are offset in relation to each other along the rotational axis of the rotary cutting tool. This means that the clamping finger bores are not concentrically arranged. The distance or offset of the center axes of the clamping finger bores is oriented along a rotational axis of the rotary cutting tool. Preferably, the offset is a few tenths of a millimeter, for example 0.1 mm to 1.5 mm. In such a configuration of the clamping finger bores, the holding element must bend slightly in order to be arranged in both clamping finger bores. Since the holding element in this case also extends through the through bore, an additional axial clamping force is exerted on the cutting insert by bending the holding element, thus holding it particularly reliably on the tool body. In the event that one of the clamping finger bores is threaded and the other clamping finger bore is threaded with a mounting section for the head section of the holding element, the clamping finger bore with the thread is closer to the tool tip than the clamping finger bore with the mounting section for the head section. This results in an axial clamping force that acts in the direction of a bottom of the mounting pocket.

It is also possible that the through bore on the cutting insert is tilted in relation to a radial direction of the rotary cutting tool. In this way, a force acting substantially in the radial direction of the rotary cutting tool, and by which the holding element is inserted into the clamping finger bores and the through bore, can be redirected to generate a clamping force share that also acts in the axial direction. The cutting insert is therefore also held particularly reliably on the tool body in this way.

For example, the through bore is tilted 0.2° to 3.5° in relation to the radial direction.

In an alternative, a centering projection is also provided at an end of the cutting insert facing away from the cutting edge, which engages a corresponding centering recess on the tool body. The centering projection is in particular circular cylindrical. The centering recess is then correspondingly shaped, and therefore also substantially circular cylindrical. The cutting insert is centered on the tool body by the centering projection, i.e., precisely aligned with regard to the rotational axis of the rotary cutting tool. This results in a rotary cutting tool with comparatively low imbalances that can be operated efficiently and reliably.

The task is additionally solved by a holding element of the type mentioned above, which comprises a threaded section, a crowned section, and a frustoconical head section. The crowned section is in this case located between the threaded section and the head section. Thus, the threaded section and the head section are each formed as opposite end sections of the holding element. Due to the presence of a threaded section, the holding element can also be referred to as a set screw. Such a holding element is suitable for reliably clamping a cutting insert in a radial direction and an axial direction to a corresponding tool body.

The holding element is formed to be used in a rotary cutting tool according to the invention.

In addition, the effects and advantages that have already been explained in connection with the rotary cutting tool according to the invention also apply to the holding element according to the invention and vice versa. In particular, the features and properties of the holding element mentioned in connection with the rotary cutting tool according to the invention naturally also apply to the holding element alone, i.e., if this is considered in isolation from the rotary cutting tool.

BRIEF DESCRIPTION OF THE DRAWINGS

The invention is explained below with reference to various exemplary embodiments that are shown in the accompanying drawings. The drawings show in.

DETAILED DESCRIPTION

Figure 1:
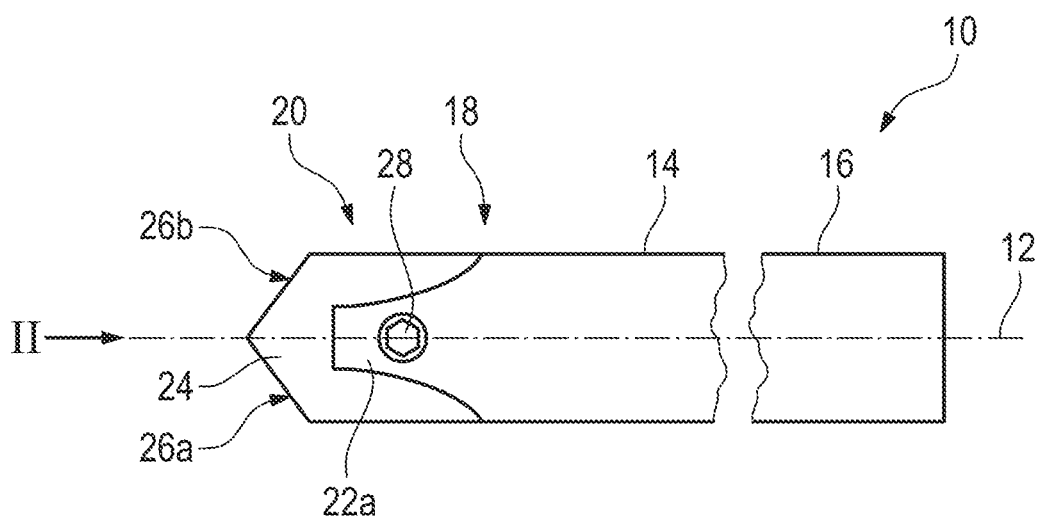
FIG. 1 a rotary cutting tool according to the invention with a holding element according to the invention in a schematic side view, FIG. 2 the rotary cutting tool of FIG. 1 when viewed along direction II, FIG. 3 the rotary cutting tool of FIG. 2 in a sectional view along plane III-III, FIG. 4 two variants of a cutting insert of the rotary cutting tool from FIGS. 1 to 3 in an isolated view corresponding to the illustration according to FIG. 3, FIG. 5 the cutting insert of the rotary cutting tool from FIGS. 1 to 3 in a side view, and FIG. 6 the holding element according to the invention in an isolated rendering.

FIG. 1 shows a rotary cutting tool 10, which is a drilling tool in the embodiment shown.

In operation, the rotary cutting tool 10 is rotated about a rotational axis 12.

The rotary cutting tool 10 has a tool body 14 extending along the rotational axis 12. This includes a machine-side end designed as a tool shaft 16, as well as a tool-tip end 18 opposing the tool shaft 16.

Figure 2:
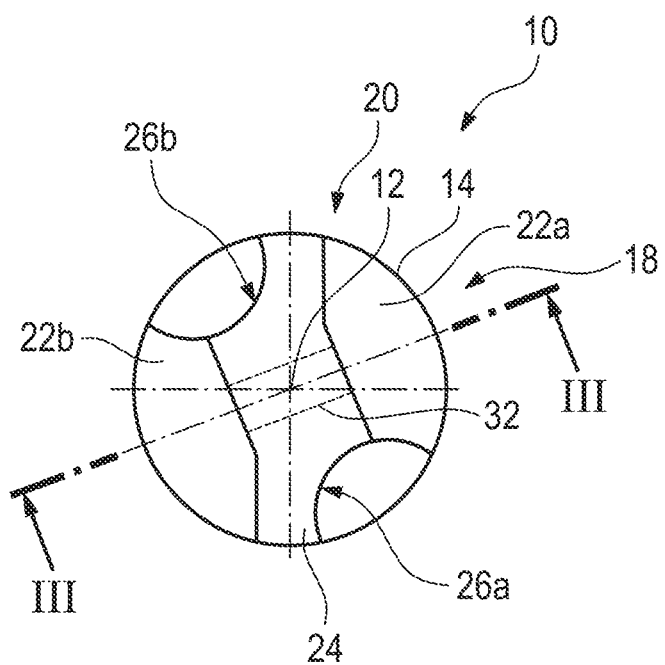

A mounting pocket 20 delimited by two clamping fingers 22a, 22b (see also FIG. 2) is formed on the tool tip end 18.

The mounting pocket 20 accommodates a cutting insert 24 that comprises two cutting edges 26a, 26b in the rendered embodiment.

The cutting insert 24 is coupled to the tool body 14 by means of a holding element 28. More specifically, the cutting insert 24 is clamped to the tool body 14 by means of the holding element 28.

For this purpose, a clamping finger bore 30a extending substantially in radial direction is provided on the clamping finger 22a and a clamping finger bore 30b also extending substantially in radial direction is provided on the clamping finger 22b.

The cutting insert 24 is provided with a through bore 32 that also extends substantially radially.

The holding element 28 is arranged in both the clamping finger bores 30a, 30b and in the through bore 32 and thus couples the cutting insert 24 to the tool body 14.

Figure 3:
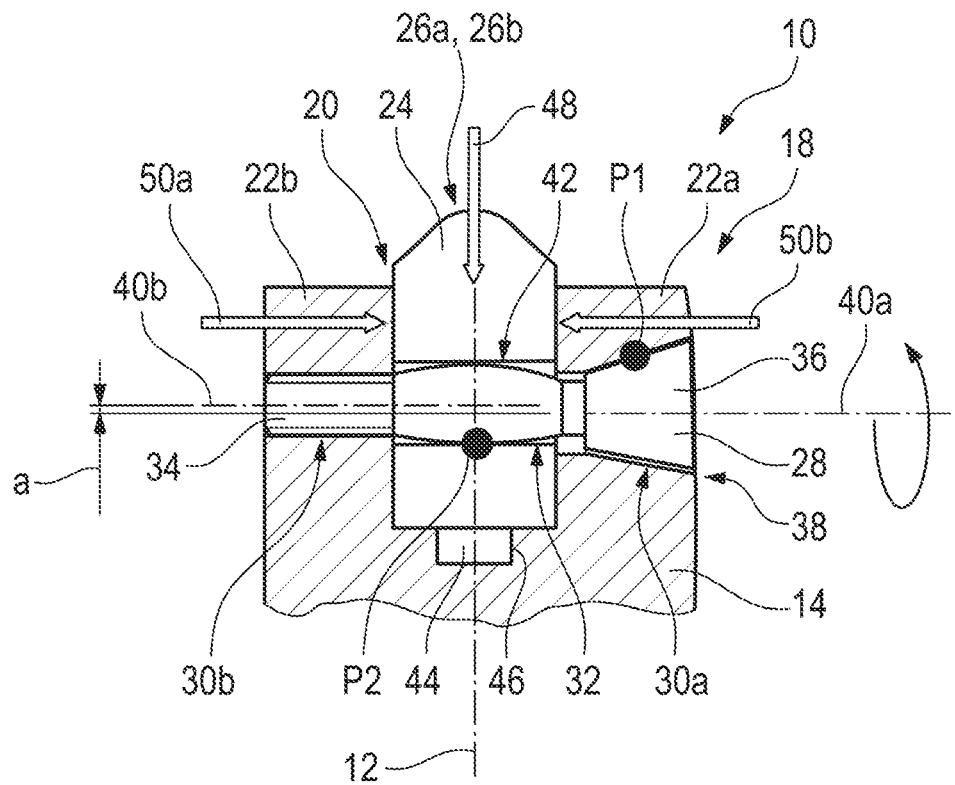
Figure 6:
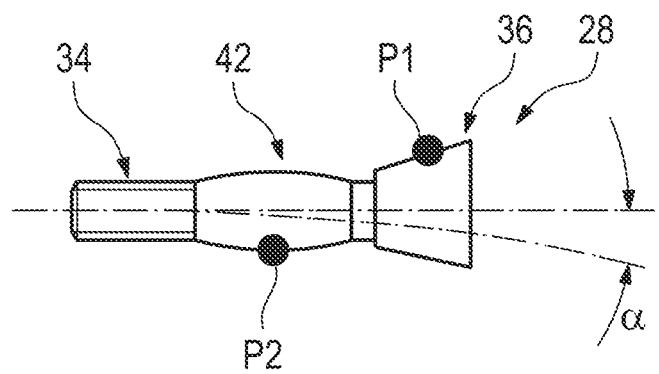

In this context, a first end section of the holding element 28 is designed as a threaded section 34 (see FIGS. 3 and 6).

The associated clamping finger bore 30b is formed as a threaded bore.

Accordingly, the threaded section 34 is threaded into the clamping finger bore 30b.

An end section of the holding element 28 opposite the threaded section 34 is formed as a head section 36 (see also FIGS. 3 and 6).

The head section 36 has a larger diameter than the remaining sections of the holding element 28 and is designed to be conically tapered. The head section 36 tapers in the direction of the threaded section 34.

In other words, the head section 36 has a frustroconical shape.

The clamping finger bore 30a forms a mounting section 38 for the head section 36. The mounting section 38 is conically tapered corresponding to the head section 36.

Thus, the clamping finger bore 30a also has a frustroconical shape.

It then tapers originating from an outer circumference of the tool body 14 in the direction of the rotational axis 12.

In the depicted embodiment, a center axis 40a of the clamping finger bore 30a is also shifted in relation to a center axis 40b of the clamping finger bore 30b by a distance a along the rotational axis 12. The clamping finger bore 30a and the clamping finger bore 30b are therefore not concentric (see FIG. 3).

The holding element 28 has a crowned section 42 between the threaded section 34 and the head section 36.

When the holding element 28 is mounted in the rotary cutting tool 10, the section 42 is located within the through bore 32.

In the depicted embodiment, the crowning is realized by the fact that the section 42 is barrel-shaped, wherein a center axis of the barrel shape coincides with a center axis of the holding element 28 (see in particular FIG. 6).

The various sections of the holding element 28 are matched to each other such that a maximum diameter of the crowned section 42 is greater than a diameter of the threaded section 34.

Additionally, a minimum diameter of the head section 36 is equal to or greater than a maximum diameter of the crowned section of the holding element 42.

Since the holding element 28 has the threaded section 34, it can also be referred to as a set screw.

Figure 4:
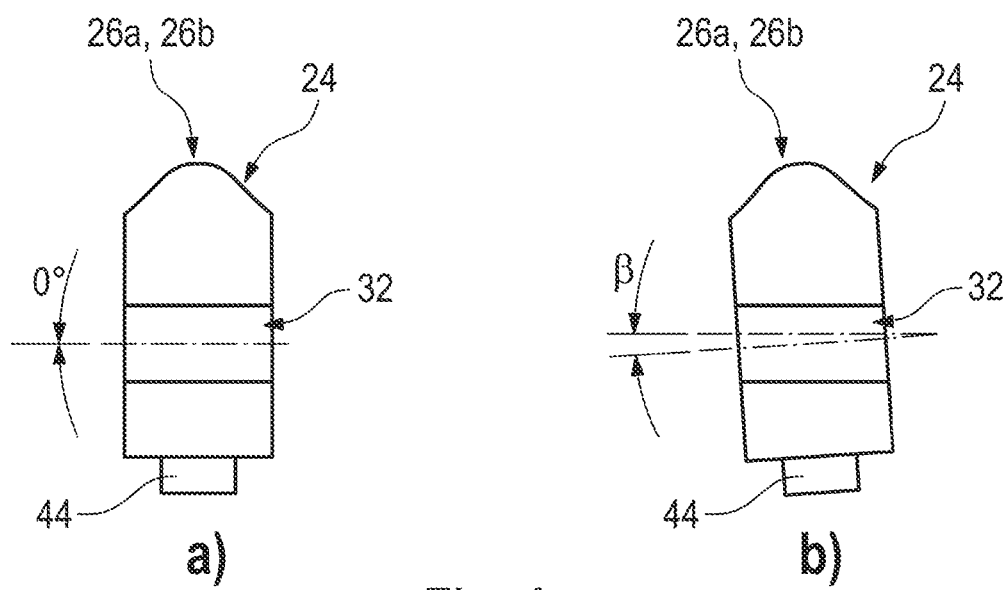
Figure 5:
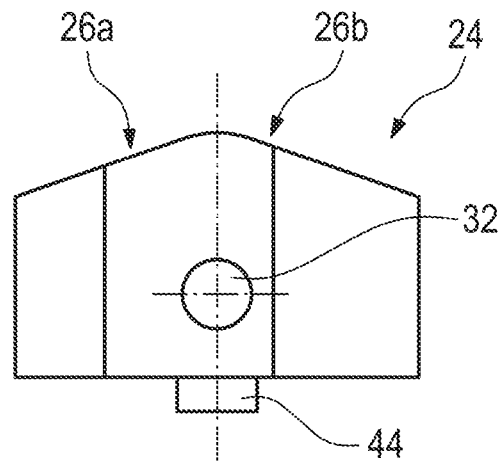

According to the variants shown in FIGS. 4 a) and 4 b), the through bore 32 on the cutting insert 24 can extend substantially in the radial direction (see FIG. 4 a)) or tilted in relation to the radial direction of the rotary cutting tool 10 (see angle β in FIG. 4 b)).

The cutting insert further comprises a centering projection 44, which engages into a corresponding centering recess 46 when mounted on the rotary cutting tool 10 (see FIG. 3).

As already mentioned, the holding element 28 is designed to clamp the cutting insert 24 to the tool body 14. The holding element 28 can then exert a clamping force acting on the cutting insert 24 along the rotational axis 12, i.e., axially (indicated by the arrow 48 in FIG. 3), and also clamping forces acting in the radial direction (indicated by arrows 50a, 50b in FIG. 3).

When the cutting insert 24 is mounted on the tool body 14, the cutting insert 24 is in this context first inserted into the mounting pocket 20, so that the centering projection 44 engages into the corresponding centering recess 46. Then, the holding element 28 is first inserted with the threaded section 34 through the clamping finger bore 30a and then through the through bore 32. The threaded section 34 is then threaded into the clamping finger bore 30b.

The threading action causes the crowned section 42 to be drawn into the through bore 32 with a certain force.

In addition, the head section 36 comes into contact with a region of the mounting section 38 arranged on the tool tip end. This is due to the offset of the center axes 40a, 40b of the clamping finger bores 30a, 30b.

When threading in the holding element 28, the head section 36 is also drawn into the mounting section 38. The offset causes the head section 36 to be bent slightly in the direction of the tool shaft 16 in relation to the threaded section 34 (see angle α FIG. 6).

When the holding element 28 is completely threaded into the clamping finger bore 30b and thus has reached its target state on the rotary cutting tool 10, the head section 36 of the holding element 28 is located in a region designated with P1 on the mounting section 38 (see FIGS. 3 and 6).

Due to the slight bending of the holding element 28, there is also a contact area designated with P2 in the area of the crowned section 42 (again see FIGS. 3 and 6).

The axial clamping force symbolized by arrow 48 thus results in particular from the installation of the holding element 28 on the cutting insert 24 in the area P2 and the installation of the holding element 28 on the clamping finger 22a in the area P1.

The invention claimed is:

1. A rotary cutting tool comprising:
a tool body extending along a rotational axis of the rotary cutting tool, the tool body comprising a mounting pocket delimited by two clamping fingers, the mounting pocket being located on a tool tip end of the tool body;
a cutting insert comprising at least one cutting edge; and
a holding element comprising a threaded section, a head section, and a crowned section that is disposed between the threaded section and head section;
wherein the crowned section is barrel-shaped and has a maximum diameter that is greater than a diameter of the threaded section;
wherein the head section conically tapers from a maximum head section diameter at an intersection with a first head end surface to a minimum head section diameter at an intersection with a second head end surface;
wherein a cylindrical portion extends from the crowned section to the conically tapered portion of the head section having the minimum head section diameter, and the cylindrical portion has a constant diameter;
wherein the minimum head section diameter is equal to or greater than a maximum diameter of the crowned section;
wherein each of the maximum diameter of the crowned section and the minimum head section diameter are greater than the constant diameter of the cylindrical portion;
wherein the cutting insert is mounted in the mounting pocket of the tool body,
wherein a first clamping finger bore extending substantially radially relative to the rotational axis is provided on a first clamping finger of the two clamping fingers and a second clamping finger bore extending substantially radially relative to the rotational axis is provided on a second clamping finger of the two clamping fingers,
wherein the cutting insert has a through bore extending substantially radially relative to the rotational axis,
wherein the head section of the holding element is arranged in the first clamping finger bore, the threaded section of the holding element is arranged in the second clamping finger bore, and the crowned section of the holding element is arranged in the through bore to couple the cutting insert to the tool body, wherein a center axis of the first clamping finger bore is offset from a center axis of the second clamping finger bore, and wherein the tool body further comprises a tool shaft extending from the tool tip end, wherein the offset between the center axis of the first clamping finger bore and the offset of the center axis of the second clamping finger bore causes the head section of the holding element to bend, in relation to the threaded section of the holding element, in a direction toward the tool shaft.

2. The rotary cutting tool according to claim 1, wherein a center axis of the barrel-shaped crowned section coincides with a center axis of the holding element.

3. The rotary cutting tool according to claim 1, wherein the second clamping finger bore is formed as a threaded bore, and wherein the threaded section of the holding element is threaded into the threaded bore.

4. The rotary cutting tool according to claim 1, wherein the minimum head section diameter is larger than remaining sections of the holding element, wherein the head section is mounted in a mounting section of the first clamping finger bore.

5. The rotary cutting tool according to claim 4, wherein the mounting section is conically tapered corresponding to the head section taper.

6. The rotary cutting tool claim 1, wherein a centering projection is provided on an end of the cutting insert facing away from the cutting edge that engages into a corresponding centering recess on the tool body.

7. The rotary cutting tool of claim 1, wherein the rotary cutting tool is a drilling tool.

8. The rotary cutting tool according to claim 1, wherein the center axis of the first clamping finger bore is offset relative to the center axis of the second clamping finger bore in the direction toward the tool shaft.

9. The rotary cutting tool according to claim 8, wherein the center axis of the first clamping finger bore is offset from the center axis of the second clamping finger bore by 0.1 mm to 1.5 mm.

10. The rotary cutting tool according to claim 1, wherein the center axis of the first clamping finger bore is offset from the center axis of the second clamping finger bore by 0.1 mm to 1.5 mm.

* * * * *